(12) United States Patent
Lee et al.

(10) Patent No.: US 9,859,053 B2
(45) Date of Patent: Jan. 2, 2018

(54) ELECTRONIC DEVICE FOR REDUCING INTERFERENCE BETWEEN A CHARGING COIL AND AN ANTENNA

(71) Applicant: Samsung Electronics Co., Ltd., Gyeonggi-do (KR)

(72) Inventors: Woo-Ram Lee, Gyeonggi-do (KR); Ki-Hyun Kim, Gyeonggi-do (KR); Jin-Hyoung Park, Gangwon-do (KR); Kil-Soo Ko, Gyeonggi-do (KR); Joon-Il Kim, Seoul (KR); Sung-Kweon Park, Gyeonggi-do (KR); Se-Ho Park, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 67 days.

(21) Appl. No.: 14/920,299

(22) Filed: Oct. 22, 2015

(65) Prior Publication Data

US 2016/0042863 A1 Feb. 11, 2016

Related U.S. Application Data

(63) Continuation of application No. 13/733,667, filed on Jan. 3, 2013, now Pat. No. 9,172,263.

(30) Foreign Application Priority Data

Jan. 4, 2012 (KR) .................. 10-2012-0000879

(51) Int. Cl.
| | | |
|---|---|---|
| *H02J 7/02* | (2016.01) | |
| *H01F 38/14* | (2006.01) | |
| *H02J 7/00* | (2006.01) | |
| *H02J 5/00* | (2016.01) | |
| *H04B 15/02* | (2006.01) | |
| *H01M 2/10* | (2006.01) | |
| *H01M 10/42* | (2006.01) | |

(Continued)

(52) U.S. Cl.
CPC .......... *H01F 38/14* (2013.01); *H01M 2/1066* (2013.01); *H01M 10/4257* (2013.01); *H01M 10/44* (2013.01); *H01Q 7/00* (2013.01); *H02J 5/005* (2013.01); *H02J 7/0042* (2013.01); *H02J 7/025* (2013.01); *H04B 15/02* (2013.01)

(58) Field of Classification Search
CPC ............ H01F 38/14; H01Q 7/00; H02J 7/025; H01M 10/4257
USPC .......................... 343/741, 742, 788, 866, 867
See application file for complete search history.

(56) References Cited

U.S. PATENT DOCUMENTS

| | | | |
|---|---|---|---|
| 2008/0062066 A1* | 3/2008 | Arai .................... | H01Q 1/2208 343/867 |
| 2008/0211455 A1* | 9/2008 | Park ........................ | H02J 7/025 320/108 |
| 2010/0093407 A1 | 4/2010 | Kawata et al. | |

(Continued)

*Primary Examiner* — Dameon E Levi
*Assistant Examiner* — Hasan Islam
(74) *Attorney, Agent, or Firm* — The Farrell Law Firm, P.C.

(57) ABSTRACT

An electronic device is provided. The electronic device includes a battery; a non-contact near field communication antenna; a wireless charging coil; and a case covering the battery, wherein the wireless charging coil is positioned between the battery and the case, and wherein one of the non-contact near field communication antenna and the wireless charging coil is positioned to surround the other one of the non-contact near field communication antenna and the wireless charging coil.

9 Claims, 7 Drawing Sheets

(51) Int. Cl.
*H01M 10/44* (2006.01)
*H01Q 7/00* (2006.01)

(56) References Cited

U.S. PATENT DOCUMENTS

| | | | |
|---|---|---|---|
| 2011/0285349 A1* | 11/2011 | Widmer | B60L 11/182 |
| | | | 320/108 |
| 2011/0316475 A1 | 12/2011 | Jung et al. | |
| 2013/0038278 A1 | 2/2013 | Park et al. | |

* cited by examiner

ELECTRONIC DEVICE FOR REDUCING INTERFERENCE BETWEEN A CHARGING COIL AND AN ANTENNA

PRIORITY

This application is a Continuation Application of U.S. patent application Ser. No. 13/733,667, which was filed in the U.S. Patent and Trademark Office on Jan. 3, 2013, and claims priority under 35 U.S.C. §119(a) to a Korean Patent Application filed in the Korean Intellectual Property Office on Jan. 4, 2012 and assigned Serial No. 10-2012-0000879, the entire content of each of which is incorporated herein by reference.

BACKGROUND OF THE INVENTION

1. Field of the Invention

The present invention relates generally to an electronic device, and more particularly, to an electronic device for preventing a non-contact near field communication antenna and a wireless charging coil from overlapping with each other.

2. Description of the Related Art

Electronic devices generally include devices such as portable terminals, mobile communication terminals, Portable Multimedia Players (PMPs), Personal Digital Assistants (PDAs), and smart phones. Herein, the term "mobile communication terminals" refers to devices enable users to communicate with other users, while the user carries the terminal.

Recently, non-contact near field communication antennas and wireless charging coils have been included within the same electronic devices for improving the convenience of such devices.

A non-contact near field communication antenna employs a Radio Frequency Identification (RFID) and Near Field Communication (NFC) for use in a wireless tag technology.

Non-contact near field communication antennas may use a 13.56 MHz frequency band, for example, to thereby enable wireless communication between the electronic devices within a distance of about 10 centimeters using a low amount of power. Non-contact near field communication antennas are currently being used in wide ranges of applications, such as electronic liquidation and identification of electronic devices.

FIG. 1 is a side cross-sectional view showing a configuration of a conventional non-contact near field communication antenna and a wireless charging device within an electronic device. FIG. 2 is a side cross-sectional view enlarging a portion denoted with 'A' in FIG. 1.

Referring to FIGS. 1 and 2, a non-contact near field communication antenna 1 is located in a battery pack 4 of an electronic device (not shown).

The wireless charging device also includes a charger equipped with primary coils (not shown) and an electronic device (not shown) equipped with secondary coils 2, wherein the secondary coils produce electromagnetically induced current from the electro-magnetic field occurring in the primary coils. The secondary coils are located on a battery cover 5 of the electronic device. Accordingly, the wireless charging device charges the battery pack 4 of the electronic device using induced current between the primary coils and the secondary coils.

As shown in FIG. 2, the secondary coils 2 include a shielding sheet 3 for preventing interference with the antenna 1.

In conventional electronic devices that have a non-contact near field communication antenna and a wireless charging device, the use of the antenna does not cause any problems when the antenna is mounted alone. However, such as shown in FIG. 2, when the non-contact near field communication antenna 1 is mounted adjacent to the secondary coils 2 of the wireless charging device such that they overlap with each other, it is impossible to perform device recognition within a distance of 10 centimeters, due to the interference between the components. Thus, the performance and functions of the electronic device are degraded, therefore, such electronic devices are unable to provide functions suitable for electronic liquidation.

Conventional shielding sheets are also constructed to fit to an entire size of the antenna in order to prevent interference with the antenna. This required size increases production costs of such shielding sheets.

Configurations of related electronic devices including non-contact near field communication antennas and wireless charging devices are disclosed in Korean Patent Registration No. 10-0989587, registered on Oct. 18, 2010, which is incorporated herein by reference.

Accordingly, there is a need for an electronic device with secondary coils disposed outside or inside of an antenna in order to prevent the non-contact near field communication antenna and the secondary coil of the wireless charging device from overlapping with each other.

SUMMARY OF THE INVENTION

Accordingly, an aspect of the present invention provides an electronic device with a wireless charging coil portion configured outside or inside a non-contact near field communication antenna to thereby prevent the non-contact near field communication antenna and the wireless charging coil portion from overlapping with each other, wherein the interference between the antenna and the wireless charging coil portion is prevented and the recognition between the respective parts is improved, and wherein the performance of the article and the function of electronic liquidation are improved.

Another aspect of the present invention provides an electronic device with a shielding portion formed along a shape of the wireless charging coil portion, so that the shielding portion is formed only along the wireless charging coil portion, instead of being formed on an area corresponding to the entire conventional antenna to thereby decrease the production costs of articles within the electronic device, including the cost of manufacturing the shielding portion itself.

According to an aspect of the present invention, an electronic device is provided. The electronic device includes a battery; a non-contact near field communication antenna; a wireless charging coil; and a case covering the battery, wherein the wireless charging coil is positioned between the battery and the case, and wherein one of the non-contact near field communication antenna and the wireless charging coil is positioned to surround the other one of the non-contact near field communication antenna and the wireless charging coil.

According to another aspect of the present invention, an electronic device is provided. The electronic device includes a battery; a non-contact near field communication antenna; a wireless charging coil; and a case covering the battery, wherein the wireless charging coil is positioned between the battery and the case, wherein one of the non-contact near field communication antenna and the wireless charging coil is positioned to surround the other one of the non-contact near field communication antenna and the wireless charging coil, wherein the non-contact near field communication antenna is positioned between the battery and the wireless charging coil, and wherein the non-contact near field communication antenna is spaced from the wireless charging coil by a predetermined distance to prevent an interference between the non-contact near field communication antenna and the wireless charging coil.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF EMBODIMENTS OF THE PRESENT INVENTION

Figure 1:
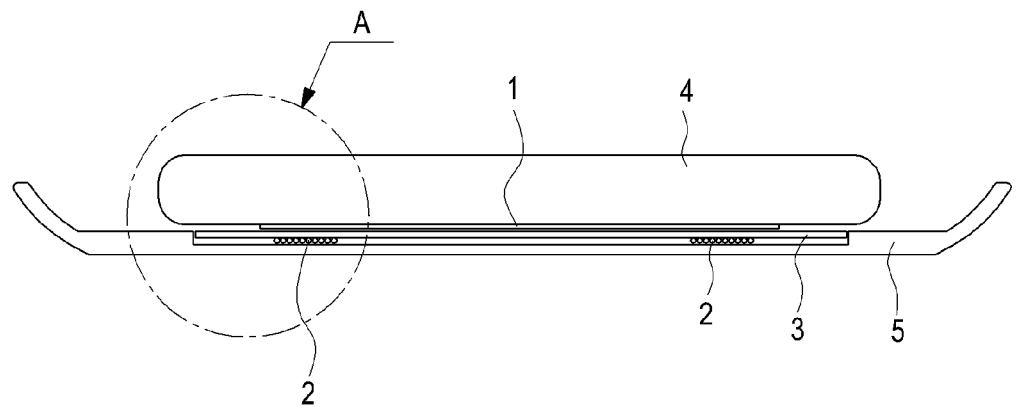
FIG. 1 is a diagram illustrating a side cross-sectional view of a configuration of an electronic device having a conventional antenna of non-contact near field communication and the wireless charging device.
Figure 2:
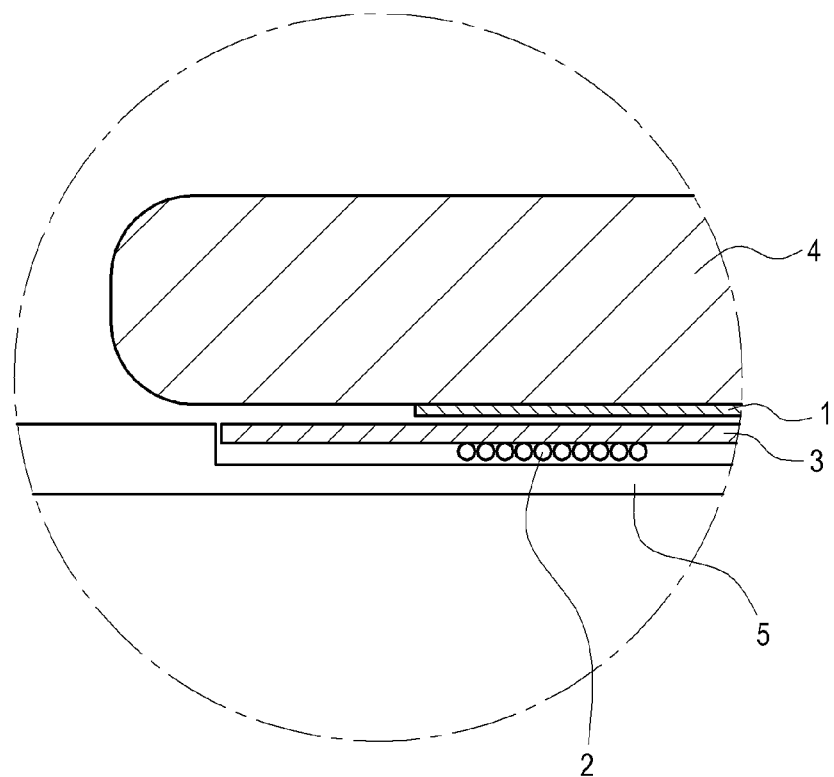
FIG. 2 is a diagram illustrating a side cross-sectional view enlarging a portion denoted with 'A' in FIG. 1.

Various embodiments of the present invention will now be described in detail with reference to the accompanying drawings. Throughout the drawings, the same drawing reference numerals will be understood to refer to the same elements, features and structures.

In the following description, specific details, such as detailed configuration and components, are merely provided to assist the overall understanding of certain embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

FIGS. 3-7 illustrate a structure of an electronic device including a non-contact near field communication antenna and a wire charging coil portion according to an embodiment of the present invention.

Figure 3:
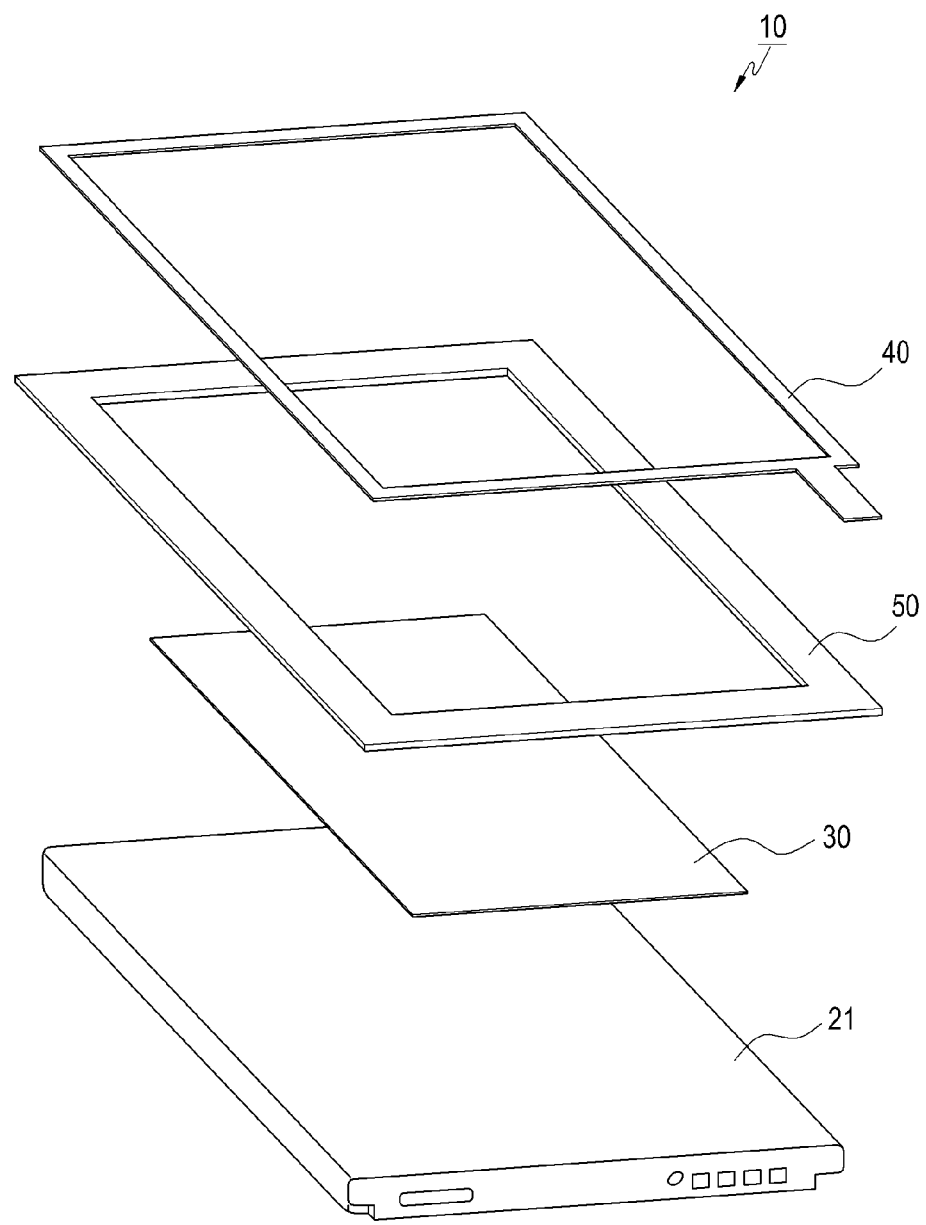
FIG. 3 is a diagram illustrating an exploded perspective view of a configuration of an electronic device having a non-contact near field communication antenna and a wireless charging coil portion according to an embodiment of the present invention.
Figure 4:
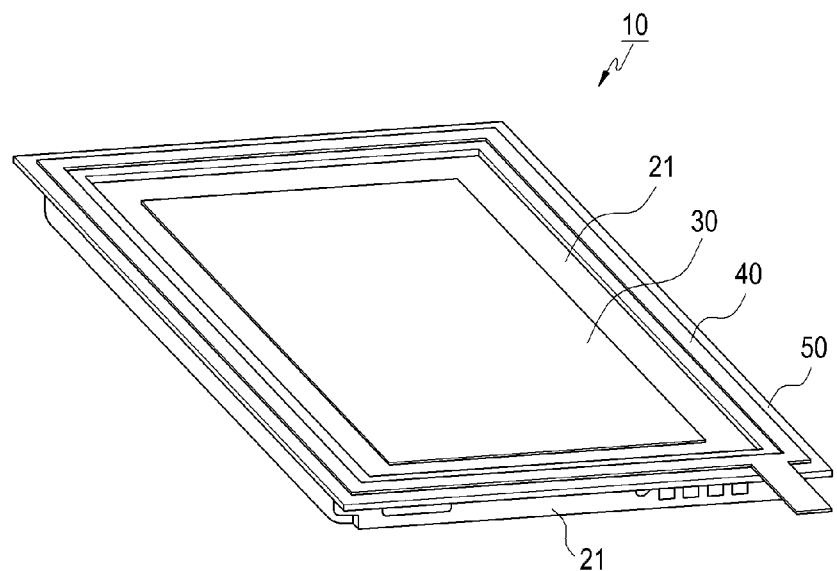
FIG. 4 is a diagram illustrating a perspective view of an assembled state of the electronic device of FIG. 3 according to an embodiment of the present invention.
Figure 5:
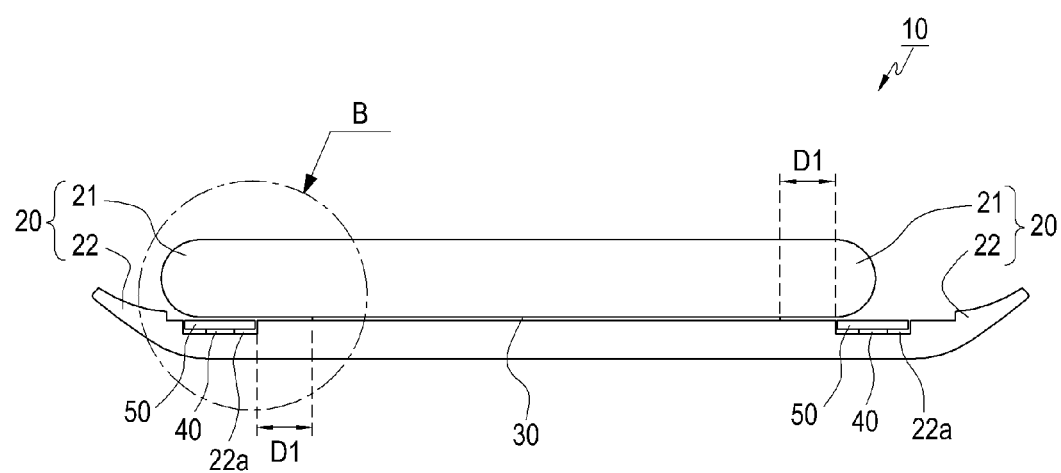
FIG. 5 is a diagram illustrating a side cross-sectional view of an assembled state of the electronic device of FIG. 3 according to an embodiment of the present invention.

The structure of an electronic device according to an embodiment of the present invention is described as follows with reference to FIGS. 3-5. FIG. 3 is a diagram illustrating an exploded perspective view of a configuration of an electronic device having a non-contact near field communication antenna and a wireless charging coil portion according to an embodiment of the present invention. FIG. 4 is a diagram illustrating a perspective view of an assembled state of the electronic device of FIG. 3 according to an embodiment of the present invention. FIG. 5 is a diagram illustrating a side cross-sectional view of an assembled state of the electronic device of FIG. 3 according to an embodiment of the present invention Referring to FIGS. 3-5, the electronic device 10 includes a main body 20, which includes a battery pack 21, a battery cover 22, a non-contact near field communication antenna 30, and a wireless charging coil portion 40. The non-contact near field communication antenna 30 is disposed on an inner side of the battery pack 21 in order to prevent the antenna 30 from overlapping with the wireless charging coil portion 40, as described in further detail herein below. The wireless charging coil portion 40 is disposed on the battery cover 22 around an outer periphery of the antenna 30 in order to prevent the wireless charging coil portion 40 from overlapping with the non-contact near filed communication antenna 30.

According to an embodiment of the present invention, the wireless charging coil portion 40 may further include a shielding portion 50 disposed along the wireless charging coil portion 40 in order to prevent the interference between the non-contact near field communication antenna 30 and the wireless charging coil portion 40, and to improve the performance of the electronic device 10.

According to an embodiment of the present invention, the non-contact near field communication antenna 30 may use a frequency band ranging from 12 to 14 MHz, but may also operate in other frequency bands in accordance with embodiments of the present invention. The wireless charging coil portion 40 may use a frequency band ranging from 100 KHz to 14 MHz, for example, but may operate in other frequency bands in accordance with embodiments of the present invention.

The shielding portion 50 may be made of ferrite or a polymer material, for example, but other materials, such as polycarbonate, may be used in accordance with embodiments of the present invention.

Referring to FIG. 5, the battery cover 22 includes a seating groove 22a for seating the wireless charging coil portion 40 and the shielding portion 50. A predetermined distance D1 is provided between the antenna 30 and the wireless charging coil portion 40 so as to prevent the antenna 30 from overlapping with the wireless charging coil portion 40.

Figure 6:
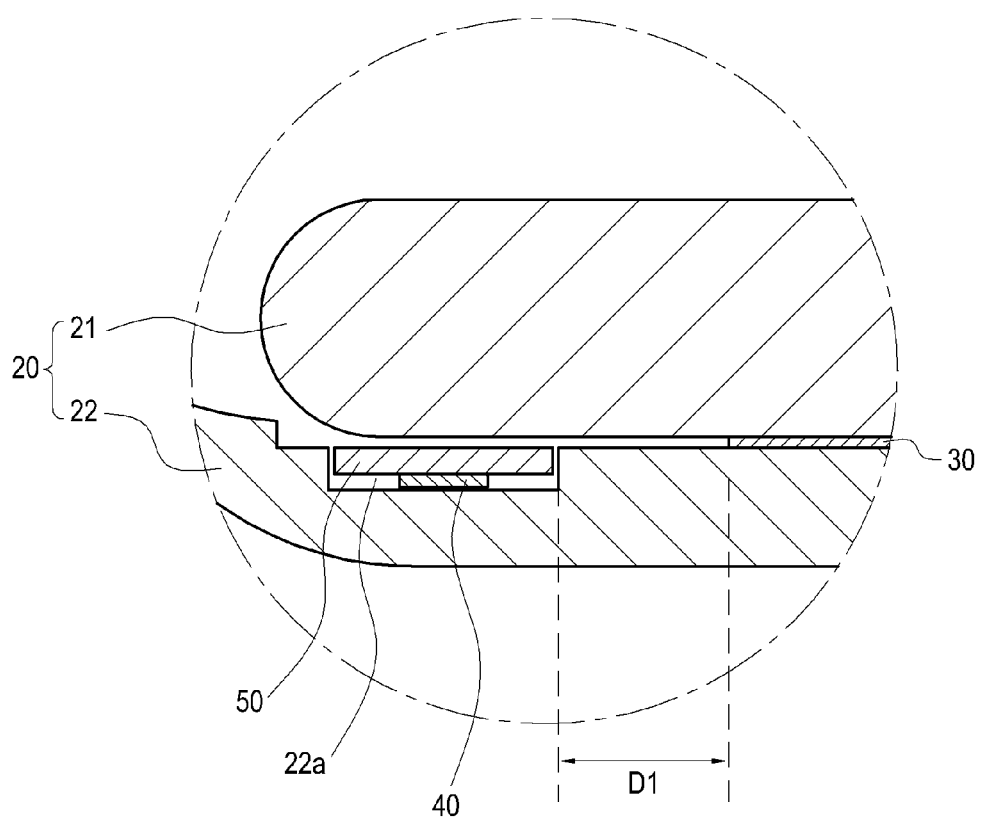
FIG. 6 is a diagram illustrating a side cross-sectional view enlarging a portion denoted with 'B' in FIG. 5 according to an embodiment of the present invention.

Operation of the electronic device 10 is described as follows with reference to FIGS. 5 and 6. FIG. 6 is a diagram illustrating a side cross-sectional view enlarging a portion denoted with 'B' in FIG. 5 according to an embodiment of the present invention.

Referring to FIG. 5, the electronic device 10 includes the battery pack 21 and the battery cover 22. The non-contact near field communication antenna 30 is disposed on the inner side of the battery pack 21, while the wireless charging coil portion 40 is disposed along the outer side of the battery cover 22. The wireless charging coil portion 40 is placed in the shielding portion 50 by insertion injection and in-molding. The shielding portion 50 is formed along the contour of the wireless charging coil portion 40 by insertion injection and in-molding. The wireless charging coil portion 40 and the shielding portion 50 are seated within the seating groove 22a formed on the inner side of the battery cover 22, so that they are coupled to the groove 22a. In this state, while the battery cover 22 and the battery pack 21 are coupled to each other, the wireless charging coil portion 40 is installed around the outer periphery of the non-contact near field communication antenna 30.

As shown in FIG. 6, the predetermined distance D1 is defined between the non-contact near field communication antenna 30 and the wireless charging coil portion 40 in order to prevent the non-contact near field communication antenna 30 from overlapping with the wireless charging coils 40.

The non-contact near field communication antenna 30 may use a frequency band ranging from 12 to 14 MHz, and the wireless charging coil portion 40 may use a frequency band ranging from 100 KHz to 14 MHz, for example, but other frequency bands may be used in accordance with embodiments of the present invention. Use of each of the frequency bands is not affected by use of the other, because the non-contact near field communication antenna 30 is spaced from the wireless charging coil portion 40 with the predetermined distance D1 in order to prevent the non-contact near field communication antenna 30 from overlapping with the wireless charging coil portion 40.

In this state, when the main body 20 of the electronic device 10 approaches a reader of near field communication device (not shown) installed outside, the non-contact near field communication receives antenna 30 a signal without any interference caused by the wireless charging coil portion 40.

In this way, the main body 20 of the electronic device receives desired services (e.g., a wireless authentication service, such as the electronic liquidation and the identification (an entry authentication)) through the non-contact near field communication antenna 30 without interference caused by the wireless charging coil portion 40.

Also, as described with reference to FIG. 6, the main body 20 of the electronic device approaches the wireless charger (not shown) when the battery pack 21 included in the main body 20 of the electronic device is wirelessly charged. The wireless charging coil portion 40 included in the battery cover 22 and the other wireless charging coil portion (not shown) included in the wireless charger produce electromagnetic induction current, so that the wireless charging coil portion 40 on the battery cover 22 charges the battery pack 21 through use of the induced current. The wireless charging coil portion 40 on the battery cover 22 is spaced from the non-contact near field communication antenna 30 by the predetermined distance D1 and the wireless charging coil portion 40 does not overlap the antenna 30, so that it is possible to charge the battery pack 21 without the interference from the antenna 30.

As described herein above, the non-contact near field communication antenna 30 and the wireless charging coil portion 40 are configured such that they do not overlap with each other on the main body 20 of the electronic device 10, thereby preventing interference between the antenna 30 and the wireless charging coil portion 40. Thereby, recognition and performance of the non-contact near field communication antenna 30 and the wireless charging coil portion 40 are improved.

The shielding portion 50 is formed along an exterior of the wireless charging coil portion 40 by insertion injection and in-molding, so that the shielding portion 50 is formed only along the wireless charging coil portion 40, in order to save the manufacturing costs with respect to the shielding portion 50.

The structure of an electronic device according to another embodiment of the present invention is described as follows with reference to FIGS. 7-10.

Figure 7:
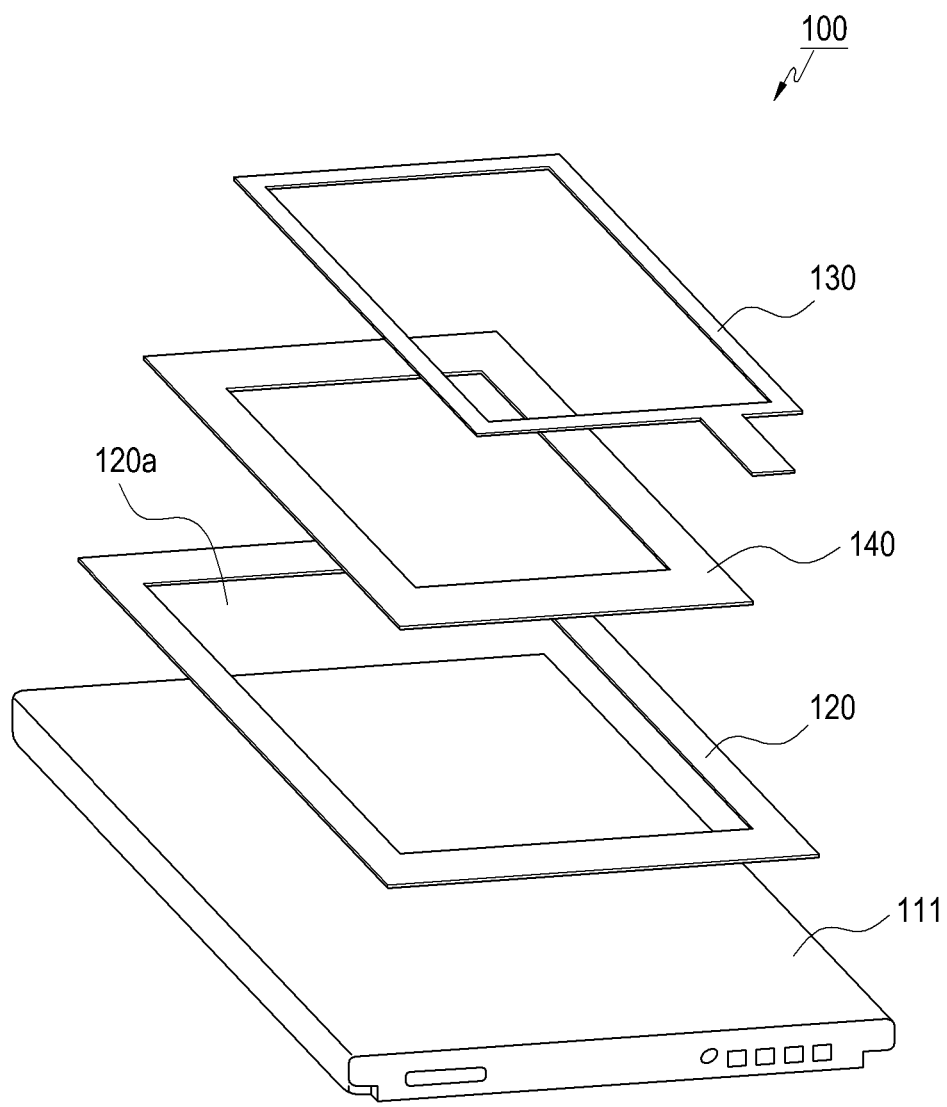
FIG. 7 is a diagram illustrating an exploded perspective view of a configuration of an electronic device having a non-contact near field communication antenna and a wireless charging coil portion according to another embodiment of the present invention.
Figure 8:
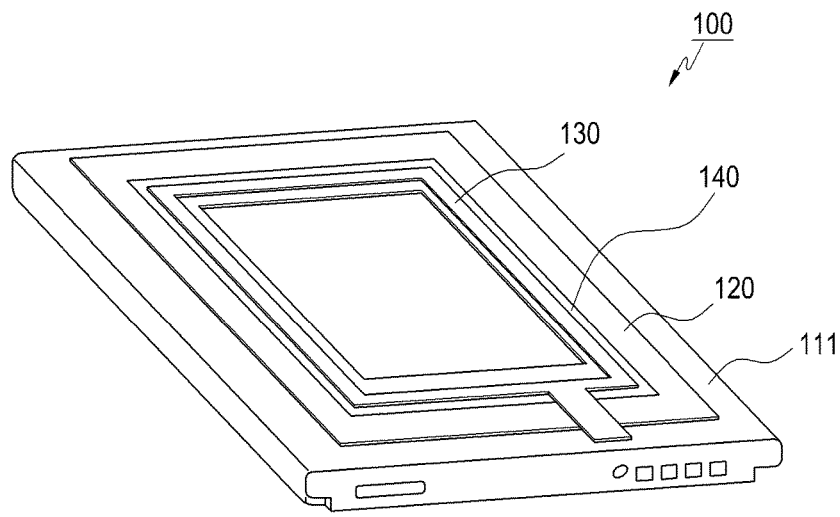
FIG. 8 is a diagram illustrating a perspective view of an assembled state of the electronic device of FIG. 7 according to an embodiment of the present invention.
Figure 9:
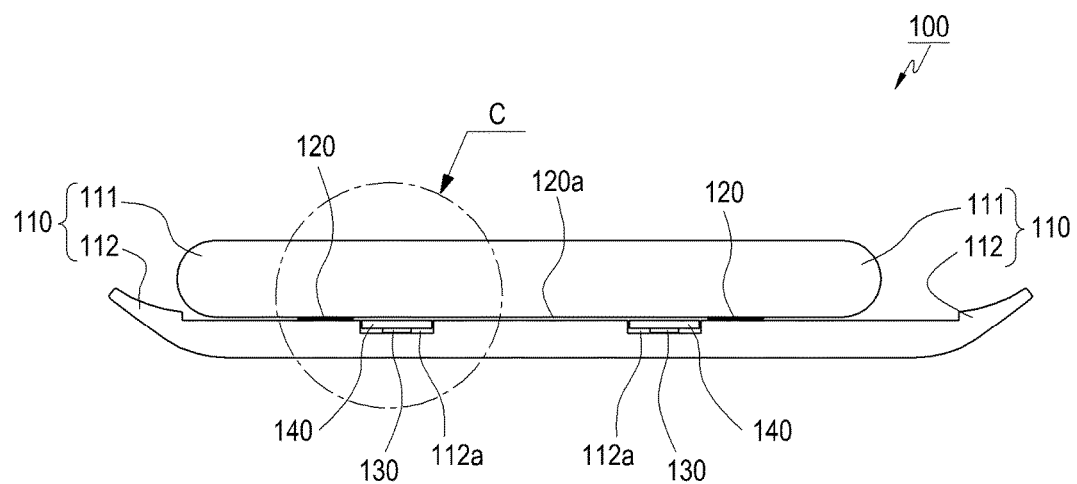
FIG. 9 is a diagram illustrating a side cross-sectional view of an assembled state of the electronic device of FIG. 7 according to an embodiment of the present invention.
Figure 10:
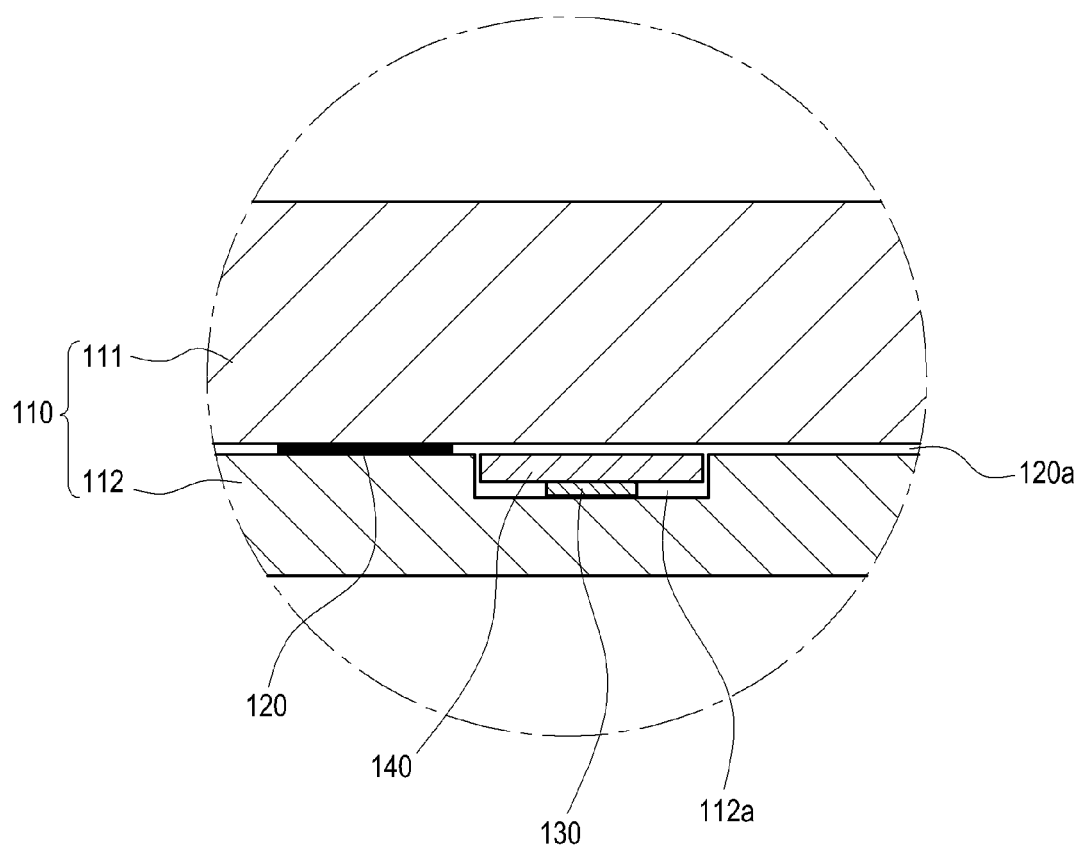
FIG. 10 is a diagram illustrating a side cross-sectional view enlarging a portion denoted with 'C' in FIG. 9 according to an embodiment of the present invention.

FIG. 7 is a diagram illustrating an exploded perspective view of a configuration of an electronic device having a non-contact near field communication antenna and a wireless charging coil portion according to another embodiment of the present invention. FIG. 8 is a diagram illustrating a perspective view of an assembled state of the electronic device of FIG. 7. FIG. 9 is a diagram illustrating a side cross-sectional view of an assembled state of the electronic device of FIG. 7. FIG. 10 is a diagram illustrating a side cross-sectional view enlarging a portion denoted with 'C' in FIG. 9.

Referring to FIGS. 7-9, an electronic device 100 includes a main body 110, which includes a battery pack 111, a battery cover 112, a non-contact near field communication antenna 120 and a wireless charging coil portion 130. The non-contact near field communication antenna 120 is disposed on an inner side of the battery pack 111 in order to prevent the antenna 120 from overlapping with the wireless charging coil portions 130, as described in further detail herein below. The wireless charging coil portion 130 is disposed on the battery cover 112 inside of the antenna 120 in order to prevent the wireless charging coil portion 130 from overlapping with the non-contact near filed communication antenna 120.

According to an embodiment of the present invention, the wireless charging coil portion 130 may further include a shielding portion 140 disposed along the wireless charging coil portion 130, in order to prevent interference between the non-contact near field communication antenna 120 and the wireless charging coil portion 130, in order improve the performance of the electronic device 100.

The antenna 120 of non-contact near field communication may use a frequency band ranging from 12 to 14 MHz, for example, and the wireless charging coil portion 130 may use a frequency band ranging from 100 KHz to 14 MHz, but other frequency bands may be used in accordance with embodiments of the present invention.

The shielding portion 140 may be made of ferrite or polymer material, but other materials (e.g., polycarbonate) may be used in accordance with embodiments of the present invention.

Referring to FIG. 9, the battery cover 112 includes a seating groove 112a for seating the wireless charging coil portion 130 and the shielding portion 140. The non-contact near field communication antenna 120 includes an inner hole 120a therein to receive the wireless charging coil portion 130.

Operation of the electronic device 100 is described as follows with reference to FIGS. 9 and 10. Referring to FIG. 9, the electronic device 100 includes the battery pack 111 and the battery cover 112. The non-contact near field communication antenna 120 is disposed on the inner side of the battery pack 21, while the wireless charging coil portion 130 is disposed on the battery cover 22. The shielding portion 140 is included in the wireless charging coil portion 130 by insertion injection and in-molding. The shielding portion 140 is formed along a shape of the wireless charging coil portion 130 by insertion injection and in-molding. The wireless charging coil portion 130 and the shielding portion 140 are seated within the seating groove 112a formed on the inner side of the battery cover 112, so that they are coupled to the seating groove 112a. In this state, while the battery cover 112 and the battery pack are coupled to each other, the wireless charging coil portion 130 is installed within an inner hole 120a of the non-contact near field communication antenna 120.

As shown in FIG. 10, with the installation of the wireless charging coil portion 130 within the inner hole 120a of the non-contact near field communication antenna 120, the antenna and the wireless charging coil portion 130 are configured not to overlap with each other.

The non-contact near field communication antenna 120 may use a frequency band ranging from 12 to 14 MHz, and the wireless charging coil portion 130 may use a frequency band ranging from 100 KHz to 14 MHz, for example, but other bands may be used in accordance with embodiments of the present invention. Each of the frequency bands is not affected by use of the other frequency band, since the wireless charging coil portion 130 is installed within the antenna 120 in a manner that does not overlap with the antenna 120.

In this state, when the main body 110 of the electronic device approaches a reader of near field communication device (not shown) installed outside of the electronic device 100, the non-contact near field communication antenna 120 receives and transmits a signal without any interference from the wireless charging coil portion 130 that is installed within the antenna 120.

In this manner, the main body 110 of the electronic device receives a desired service (i.e., a wireless authentication service, such as the electronic liquidation and device identification, such as an entry authentication) through the non-contact near field communication antenna 120 without interference from the wireless charging coil portion 130.

Also, as described with reference to FIG. 10, the main body 20 of the electronic device approaches the wireless charger (not shown) when the battery pack 111 included in the main body 110 of the electronic device is wirelessly charged. The wireless charging coil portion 130 included in the battery cover 112 and the other wireless charging coil portion (not shown) included in the wireless charger (not shown) produce electromagnetic induction current, so that the wireless charging coil portion 130 on the battery cover 112 charges the battery pack 111 through use of the induced current. As the wireless charging coil portion 130 on the battery cover 112 is installed within the non-contact near field communication antenna 120, the wireless charging coil portion does not overlap with the antenna 120, and thus it is possible to perform the charging operation without the interference from the antenna 120.

As described herein above, the installation of the wireless charging coil portion 130 within the antenna 120 prevents the antenna 120 and the wireless charging coil portion 130 from overlapping with each other. Thereby, interference between the wireless charging coil portion 130 and the antenna 120 is prevented, and recognition and performance of the non-contact near field communication antenna 120 and the wireless charging coil portion 130 is improved.

The above-described electronic devices (i.e., the electronic device 10 and the electronic device 100 of FIGS. 4 and 9, respectively) according to the embodiments of the present invention may be included in a portable terminal.

However, the above-described electronic devices are not limited to portable terminals, and may be applied to various other types of terminals.

Various types of terminals according to embodiments of the present invention include all types of mobile communication terminals operating on the basis of the communication protocols corresponding to various communication systems, all types of information and telecommunication devices, multimedia devices, and application devices thereof, such as Moving Picture Experts Group Audio Layer-3 (MP3) players, Portable Multimedia Players (PMPs), navigation devices, game devices, notebook computers, advertisement devices, televisions, digital broadcasting players, Personal Digital Assistants (PDAs), and smart phones.

While the present invention has been shown and described with reference to certain embodiments thereof, it will be understood by those skilled in the art that various changes in form and details may be made therein without departing from the spirit and scope of the present invention as defined by the appended claims and their equivalents.

What is claimed is:

1. An electronic device comprising:
   a battery;
   a non-contact near field communication antenna;
   a wireless charging coil; and
   a case covering the battery,
   wherein the wireless charging coil is positioned between the battery and the case,
   wherein one of the non-contact near field communication antenna and the wireless charging coil is positioned to surround the other one of the non-contact near field communication antenna and the wireless charging coil,
   wherein the non-contact near field communication antenna is positioned between the battery and the wireless charging coil, and
   wherein the non-contact near field communication antenna is spaced from the wireless charging coil by a predetermined distance to prevent an interference between the non-contact near field communication antenna and the wireless charging coil.

2. The electronic device of claim 1, wherein the wireless charging coil is positioned to surround the non-contact near field communication antenna.

3. The electronic device of claim 1, wherein the non-contact near field communication antenna is positioned to surround the wireless charging coil.

4. The electronic device of claim 1, wherein the wireless charging coil is electrically connected to the electronic device.

5. The electronic device of claim 1, wherein the non-contact near field communication antenna is electrically connected to the electronic device.

6. The electronic device of claim 1, further comprising a shielding portion disposed along the wireless charging coil and having a shape corresponding to a shape of the wireless charging coil.

7. The electronic device of claim 6, wherein the shielding portion is made from ferrite or a polymer.

8. The electronic device of claim 6, wherein the case is formed with a seating groove for seating the wireless charging coil and the shielding portion.

9. The electronic device of claim 1, wherein the non-contact near field communication antenna uses frequency bands ranging from 12 to 14 MHz, and the wireless charging coil uses frequency bands ranging from 100 KHz to 14 MHz.

* * * * *